United States Patent
Milani et al.

(10) Patent No.: US 12,452,626 B2
(45) Date of Patent: Oct. 21, 2025

(54) MACHINE LEARNING MODEL PREDICTION OF AN OPPORTUNITY FOR AN ENTITY CATEGORY IN A GEOGRAPHIC AREA

(71) Applicant: Capital One Services, LLC, McLean, VA (US)

(72) Inventors: Rosa Milani, Wynnewood, PA (US); Michael Mossoba, Great Falls, VA (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 610 days.

(21) Appl. No.: 17/823,179

(22) Filed: Aug. 30, 2022

(65) Prior Publication Data

US 2024/0073641 A1     Feb. 29, 2024

(51) Int. Cl.
*H04W 4/021*     (2018.01)
*H04W 4/02*      (2018.01)
*H04W 4/029*     (2018.01)

(52) U.S. Cl.
CPC .......... *H04W 4/022* (2013.01); *H04W 4/023* (2013.01); *H04W 4/029* (2018.02)

(58) Field of Classification Search
CPC ............ G06N 20/00; G06N 7/01; G06N 5/04; G06Q 40/03; H04W 4/022; H04W 4/029; H04W 4/023
See application file for complete search history.

(56) References Cited

U.S. PATENT DOCUMENTS

| | | | | |
|---|---|---|---|---|
| 11,315,088 | B1* | 4/2022 | McCully | G06Q 20/10 |
| 11,599,939 | B2* | 3/2023 | James | G06Q 40/03 |
| 2014/0350975 | A1* | 11/2014 | Paperno | G06Q 10/02 |
| | | | | 705/5 |
| 2015/0032511 | A1* | 1/2015 | Haddad | G06Q 30/0205 |
| | | | | 705/7.34 |
| 2015/0142595 | A1* | 5/2015 | Acuna-Rohter | G06Q 20/40 |
| | | | | 705/21 |
| 2016/0026936 | A1* | 1/2016 | Richardson | G06Q 10/02 |
| | | | | 705/5 |
| 2016/0034845 | A1* | 2/2016 | Hiyama | G06Q 10/02 |
| | | | | 705/7.15 |
| 2019/0164173 | A1* | 5/2019 | Liu | G06N 20/00 |
| 2020/0265512 | A1* | 8/2020 | James | G06Q 40/03 |
| 2020/0349641 | A1* | 11/2020 | Fidanza | G06N 20/00 |

(Continued)

*Primary Examiner* — Dung Hong
(74) *Attorney, Agent, or Firm* — Harrity & Harrity, LLP

(57) ABSTRACT

In some implementations, a device may obtain event data relating to events involving one or more entities and one or more individuals, where the one or more entities are associated with entity categories. The device may determine, based on origin locations of the one or more individuals and locations of the one or more entities, distances between the origin locations of the one or more individuals and the locations of the one or more entities, the distances indicating travel distances of the one or more individuals to perform exchanges in the entity categories associated with the one or more entities. The device may determine, based on the event data and the distances, that a geographic area is associated with an opportunity for an entity category. The device may transmit a notification indicating the opportunity for the entity category in the geographic area.

20 Claims, 6 Drawing Sheets

(56) References Cited

U.S. PATENT DOCUMENTS

2020/0380579 A1\* 12/2020 Burris ..................... G10L 15/22
2021/0383489 A1\* 12/2021 Hutchinson ............. G06F 16/29
2023/0005042 A1\*  1/2023 Key ................... G06Q 30/0639

\* cited by examiner

MACHINE LEARNING MODEL PREDICTION OF AN OPPORTUNITY FOR AN ENTITY CATEGORY IN A GEOGRAPHIC AREA

BACKGROUND

Transactions often involve use of a transaction card (e.g., a credit card, a debit card, a gift card, an automated teller machine (ATM) card, a rewards card or client loyalty card, or the like) to pay for products or services at a transaction terminal (e.g., point of sale (PoS) terminal) of an individual or business engaged in the sale of goods or services (e.g., via a swiping of the transaction card at a card reader, insertion of the transaction card into a chip reader, or wireless transmission of transaction card data to a wireless receiver). In some instances, a magnetic strip, integrated circuit chip, radio frequency (RF) antenna, and/or radio frequency identification (RFID) tag may be included in a transaction card to provide information associated with the transaction card (e.g., an account identifier, account information, a payment token, or the like).

SUMMARY

Some implementations described herein relate to a system for machine learning model prediction of an opportunity for an entity category in a geographic area. The system may include one or more memories and one or more processors communicatively coupled to the one or more memories. The one or more processors may be configured to obtain information relating to an application for services by an entity. The entity may be associated with an entity category and a geographic area. The one or more processors may be configured to obtain event data relating to events involving one or more entities and one or more individuals associated with origin locations in the geographic area. The one or more entities may be associated with entity categories. The one or more processors may be configured to obtain location data indicating the origin locations of the one or more individuals and locations of the one or more entities. The one or more processors may be configured to determine, based on the location data, distances between the origin locations of the one or more individuals and the locations of the one or more entities. The distances may indicate travel distances of the one or more individuals to perform exchanges in the entity categories associated with the one or more entities. The one or more processors may be configured to determine, using a machine learning model and based on the event data and the distances, whether the geographic area is associated with an opportunity for the entity category. The one or more processors may be configured to perform an operation to cause approval or rejection of the application based on whether the geographic area is associated with the opportunity for the entity category.

Some implementations described herein relate to a method of machine learning model prediction of an opportunity for an entity category in a geographic area. The method may include obtaining, by a device, event data relating to events involving one or more entities and one or more individuals, where the one or more entities are associated with entity categories. The method may include determining, by the device based on origin locations of the one or more individuals and locations of the one or more entities, distances between the origin locations of the one or more individuals and the locations of the one or more entities, the distances indicating travel distances of the one or more individuals to perform exchanges in the entity categories associated with the one or more entities. The method may include determining, by the device using a machine learning model and based on the event data and the distances, that a geographic area is associated with an opportunity for an entity category. The method may include transmitting, by the device, a notification indicating the opportunity for the entity category in the geographic area.

Some implementations described herein relate to a non-transitory computer-readable medium that stores a set of instructions for prediction of an opportunity for an entity category in a geographic area. The set of instructions, when executed by one or more processors of a device, may cause the device to obtain event data relating to events involving one or more entities and one or more individuals, where the one or more entities are associated with entity categories. The set of instructions, when executed by one or more processors of the device, may cause the device to determine, using a machine learning model and based on the event data, that a geographic area is associated with an opportunity for an entity category. The set of instructions, when executed by one or more processors of the device, may cause the device to transmit a notification indicating the opportunity for the entity category in the geographic area.

DETAILED DESCRIPTION

Figure 1A:
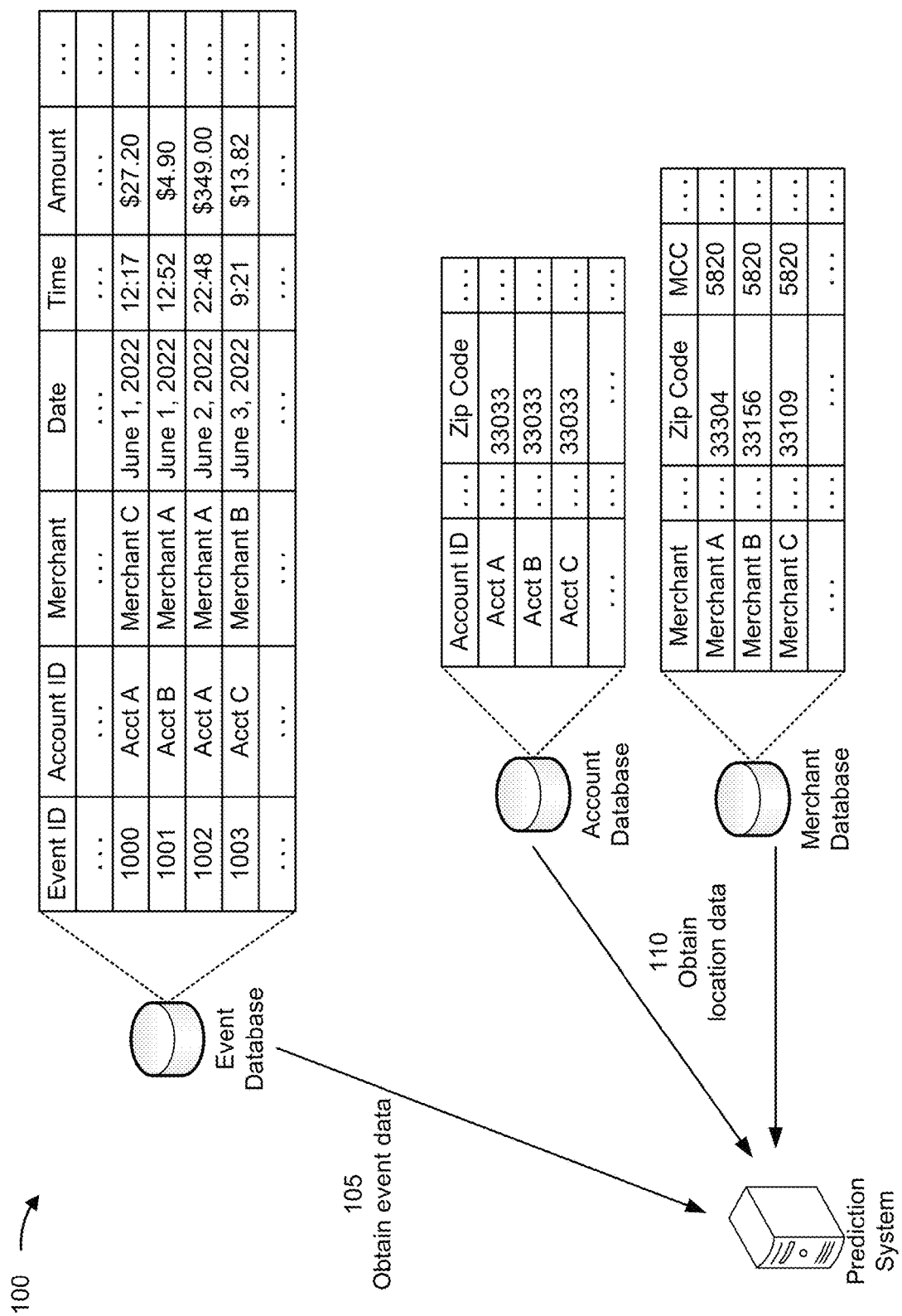
FIGS. 1A-1C are diagrams of an example associated with machine learning model prediction of an opportunity for an entity category in a geographic area, in accordance with some embodiments of the present disclosure.

The following detailed description of example implementations refers to the accompanying drawings. The same reference numbers in different drawings may identify the same or similar elements.

Before beginning operations in a particular geographic area, a business may expend significant computing resources (e.g., processing resources, memory resources, storage resources, or the like) gathering and analyzing information to identify market opportunities. Often, this analysis may produce inaccurate results. Similarly, an organization, such as a financial institution, may expend significant computing resources investigating the likelihood that a business, seeking a business loan, will succeed or fail, and such an investigation may also produce inaccurate results. Moreover, if the business performs poorly, or fails, and is unable to repay the business loan, the organization may consume further computing resources attempting to compel repayment, investigating non-payment, and/or reporting non-payment, among other examples.

Some implementations described herein provide a system that may use machine learning to identify whether an entity category (e.g., "restaurant," "barbeque restaurant," "bookstore," or the like) is associated with an opportunity in a geographic area (e.g., a neighborhood, a zip code, a city, a county, a state, or the like). To identify the opportunity, the system may use event data indicating events (e.g., transactions, search engine searches, virtual assistant requests, and/or global positioning system destination entries, among other examples) between entities (e.g., merchants, service providers, retailers, and/or wholesalers, among other examples) and individuals. For example, the system may input the event data to a machine learning model, and the machine learning model may output an indication of whether an entity category is associated with an opportunity in a geographic area based on the event data. In some implementations, in addition to the event data, the system may input information indicating distances between origin locations of individuals (e.g., residence locations of the individuals, office locations of the individuals, and/or other locations that the individuals have registered with one or more organizations) and locations of entities involved in events together to the machine learning model, and the machine learning model may output an indication of whether an entity category is associated with an opportunity in a geographic area based on the event data and the distances.

In this way, the system may accurately determine whether an entity category is associated with an opportunity in a geographic area. Accordingly, the system may conserve computing resources that would otherwise be expended to identify opportunities with less accuracy. Moreover, by using machine learning, the system may apply a rigorous and automated process to determine whether an entity category is associated with an opportunity in a geographic area. The machine learning used by the system may increase accuracy and consistency and may reduce delay associated with identifying opportunities, relative to requiring computing resources to be allocated for tens, hundreds, or thousands of operators to manually identify opportunities.

Figure 1B:
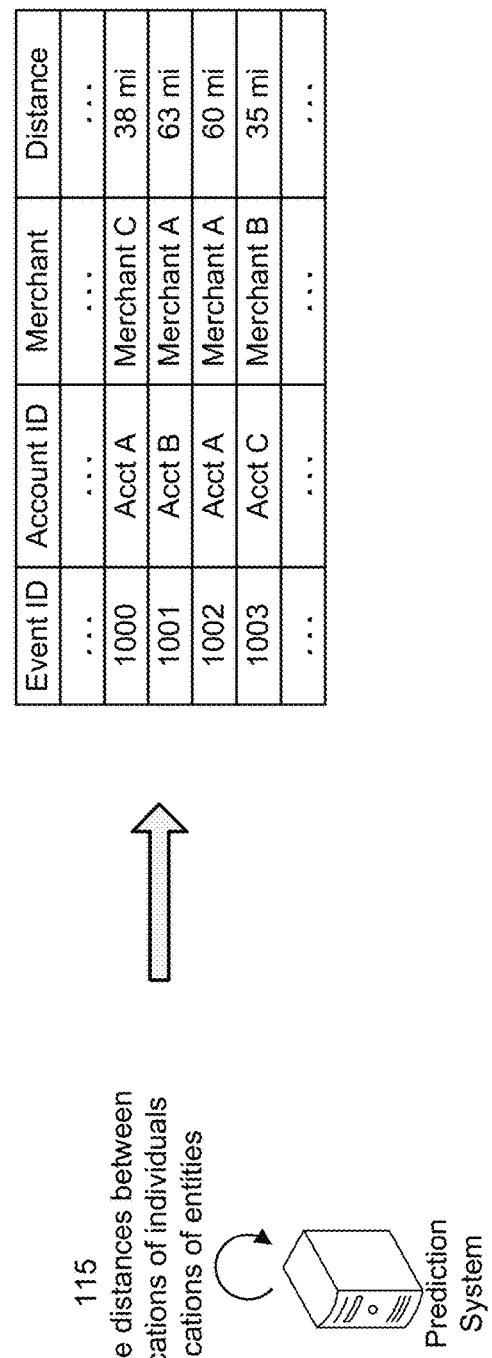
Figure 1C:
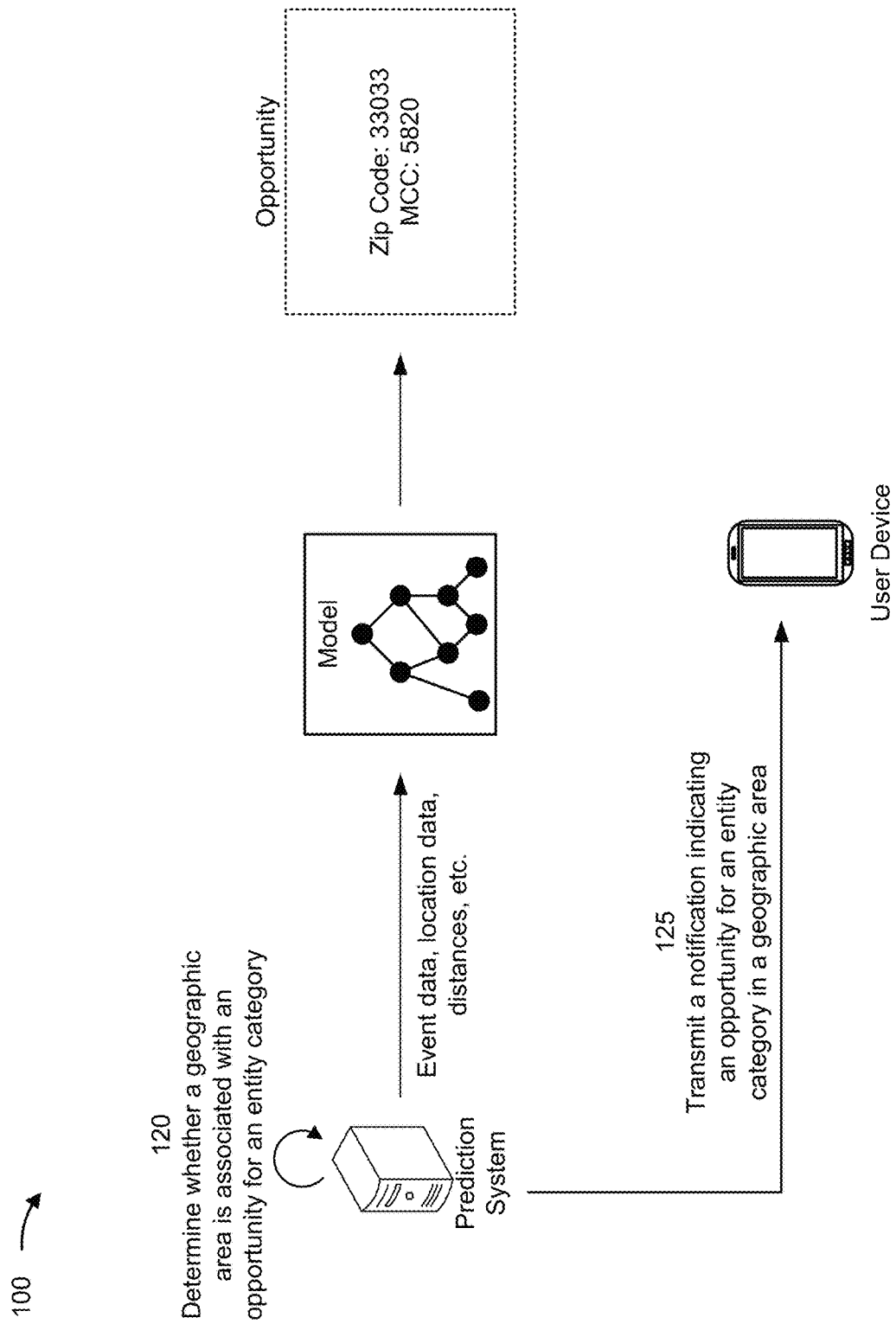

FIGS. 1A-1C are diagrams of an example 100 associated with machine learning model prediction of an opportunity for an entity category in a geographic area. As shown in FIGS. 1A-1C, example 100 includes a prediction system and one or more databases (e.g., an event database, an account database, and/or a merchant database). These devices are described in more detail in connection with FIGS. 2 and 3. The prediction system may be associated with an organization, such as a financial institution.

As described herein, the prediction system may perform operations associated with predicting an opportunity for an entity category in a geographic area (e.g., a neighborhood, a zip code, a city, a county, or the like). The opportunity may indicate that demand for goods and/or services in the entity category is unmet in the geographic area. Accordingly, the opportunity may be one to modify a website (e.g., content of the website, metadata of the website, or the like) to target the entity category in the geographic area, to modify a search engine algorithm to prioritize results associated with the entity category in the geographic area, to modify a virtual assistant algorithm to improve recommendations associated with the entity category in the geographic area, to update global positioning system map data for the entity category in the geographic area, to modify a user interface (e.g., that presents global positioning system map data) to feature entities associated with the entity category in the geographic area, to establish a new business in the entity category in the geographic area, and/or to improve or expand an existing business in the entity category in the geographic area, among other examples.

In some implementations, the prediction system may perform the operations associated with predicting the opportunity in connection with general market research or in connection with specific market research for a requesting entity. The market research may relate to a particular geographic area. The requesting entity may be associated with an entity category (e.g., relating to goods and/or services that the entity is currently offering or intends to offer). In some implementations, the prediction system may perform the operations associated with predicting the opportunity in connection with an application for services. For example, an entity may apply for services, such as loan services, line of credit services, and/or mortgage services, among other examples, from the organization associated with the prediction system. Accordingly, the prediction system may obtain information relating to the application for services by the entity. The entity may be associated with an entity category (e.g., relating to goods and/or services that the entity is currently offering or intends to offer) and a geographic area (e.g., in which the entity currently has a location or intends to establish a location). An entity category may be a general category, such as "restaurant" or "clothing store," or a specific category, such as "barbeque restaurant" or "children's clothing store." In some examples, an entity category may correspond to a merchant category code (MCC).

As shown in FIG. 1A, and by reference number 105, the prediction system may obtain event data (e.g., from an event database) relating to events involving one or more entities (e.g., different entities than the entity that applied for the services or the entity requesting market research) and one or more individuals. For example, an event may be an exchange between an entity and an individual (e.g., using a personal account or a business account), a search by the individual (e.g., in a search engine) relating to the entity, a request made by the individual (e.g., to a digital assistant) relating to the entity, and/or a global positioning system destination entry made by the individual relating to the entity, among other examples. In particular, an event may be a transaction for goods and/or services between an entity and an individual. The exchange (e.g., the transaction) may be performed using a transaction card issued to the individual by the organization. As shown, the event data may indicate, for an event, an entity (shown as "Merchant") and an individual (shown as "Account ID") involved in the event, a time and/or a date of the event, and/or an amount (e.g., a transaction amount) associated with event. In some cases, the event data may indicate one or more items associated with the event (e.g., particular goods and/or services involved in a transaction).

The event data obtained by the prediction system may relate to a particular time period (e.g., a previous six months, a previous year, or the like). In some implementations, the individuals to which the event data relates may be all individuals for which events can be tracked by the organization (e.g., all individuals that have been issued transaction cards by the organization). In some implementations, the individuals to which the event data relates may be individuals (e.g., a subset of all of the individuals) associated with origin locations (e.g., physical addresses) in a particular geographic area. For example, the particular geographic area may be the geographic area for which market research was requested or the geographic area associated with the entity that applied for services. An origin location of an individual may be a residence location of the individual, an office location of the individual, or another location that the individual has registered with the organization.

As shown by reference number 110, the prediction system may obtain location data relating to the entities and the individuals involved in the events. For example, the prediction system may obtain the location data from user data (e.g., in the account database) maintained by the organization (e.g., relating to all individuals that have been issued transaction cards by the organization) and/or entity data (e.g., in the merchant database) maintained by the organization or elsewhere (e.g., relating to all entities that can accept transaction cards issued by the organization as payment). The location data may indicate origin locations of the individuals (e.g., static, physical addresses associated with the individuals) and locations of the entities (e.g., static, physical addresses associated with the entities).

As shown in FIG. 1B, and by reference number 115, the prediction system may determine distances (e.g., driving distances or linear distances) between the origin locations of the individuals and the locations of the entities. That is, the prediction system may determine the distances based on the location data. Each distance determined by the prediction system between an origin location of an individual and a location of an entity may be for an individual and an entity involved in the same event indicated by the event data. Thus, the distances determined by the prediction system may indicate travel distances of the individuals to perform exchanges in the entity categories associated with the entities. For example, if an entity category of an entity is "bookstore," and a distance between an origin location of an individual involved in an event with the entity and a location of the entity is 20 miles, then the distance may indicate that the individual traveled 20 miles to perform an exchange at a bookstore. In some implementations, the prediction system may determine the distances by locally computing the distances (e.g., using a shortest path algorithm, or the like). In some implementations, the prediction system may determine the distances by providing information identifying the origin locations of the individuals and the locations of the entities to another device that computes the distances, and receiving from the device information identifying the distances (e.g., via an application programming interface (API)).

As shown in FIG. 1C, and by reference number 120, the prediction system may determine whether a geographic area is associated with an opportunity for an entity category. For example, the prediction system may determine whether the geographic area for which market research was requested is associated with an opportunity for the entity category associated with the requesting entity, or whether the geographic area associated with the entity that applied for services is associated with an opportunity for the entity category associated with the entity that applied for services. As another example, the prediction system may determine whether a geographic area is associated with an opportunity for an entity category independent of a request for market research or an application for services (e.g., the determination is not dictated by a particular geographic area and/or a particular entity category).

The prediction system may determine whether a geographic area is associated with an opportunity for an entity category based on the event data and/or the distances. For example, based on the event data, the prediction system may identify a lack of events (e.g., an absence of events or relatively few events) in a particular entity category for a particular geographic area, and the prediction system may determine an opportunity for the entity category in the geographic area based on the lack of events. In particular, the prediction system may identify an entity category that is associated with events of the event data (e.g., associated with a threshold quantity of events) for one or more geographic areas (e.g., a threshold quantity of geographic areas) where the event data lacks a threshold amount of events (e.g., one, ten, or the like) for another geographic area. As an example, the event data may indicate thousands of events in the entity category "bookstore" in a first geographic area (e.g., a first zip code) but not a single event in the entity category "bookstore" in a second geographic area (e.g., a second zip code), thereby indicating an opportunity for the entity category in the second geographic area.

Additionally, or alternatively, based on the distances, the prediction system may identify that individuals with original locations in a particular geographic area are traveling at least a threshold distance (e.g., 10 miles, 20 miles, 30 miles, or the like) to perform exchanges in a particular entity category, and the prediction system may determine an opportunity for the entity category in the geographic area based on the individuals traveling more than the threshold distance. For example, the distances may indicate that thousands of individuals with origin locations in a geographic area (e.g., a particular zip code) have traveled at least 20 miles to perform an exchange in the entity category "bookstore," thereby indicating an opportunity for the entity category in the geographic area. The prediction system may identify that individuals with origin locations in the geographic area are traveling more than the threshold distance for the entity category if a threshold quantity of individuals traveled more than the threshold distance for the entity category or if an average distance traveled by individuals for the entity category satisfies the threshold distance.

In some implementations, the prediction system may determine whether a geographic area is associated with an opportunity for an entity category using a machine learning model. The machine learning model may be trained to determine whether a geographic area is associated with an opportunity for an entity category using an unsupervised learning technique. Using unsupervised learning, the machine learning model may be trained on a set of observations that do not include a target variable, and the machine learning model may learn patterns from the set of observations without labeling or supervision. For example, the unsupervised learning technique may be based on an unsupervised anomaly detection algorithm, such as an unsupervised neural network algorithm or a clustering algorithm. In other words, the machine learning model may be trained to recognize patterns in data that indicate anomalies. For example, an anomaly may be that individuals in a geographic area travel on average two miles to perform exchanges at restaurants, but travel on average 20 miles to perform exchanges at barbeque restaurants.

In some implementations, the machine learning model may be trained using unlabeled event data relating to events across multiple geographic areas. Moreover, the machine learning model may be trained to output information indicating an entity category associated with an opportunity (e.g., an anomaly) based on an input of event data relating to a particular geographic area (e.g., a geographic area segment of all geographic areas). That is, the machine learning model may be trained to identify anomalies in a segment of the total data relative to the total data. In some implementations, the machine learning model may be trained to output information indicating an entity category associated with an opportunity (e.g., an anomaly) based on an input of event data relating to events across multiple geographic areas and an input of information identifying a particular geographic area of interest. That is, the machine learning model may be trained to identify anomalies in the total data with respect to a particular geographic area of interest. In some implementations, a further input to the machine learning model may be an entity category of interest (e.g., along with an input of event data and/or an input identifying a particular geographic area of interest), and the machine learning model may be trained to identify a cluster for the entity category (e.g., a first cluster for "opportunity," a second cluster for "not an opportunity," a third cluster for "uncertain," or the like).

In some implementations, the machine learning model used to determine whether a geographic area is associated with an opportunity for an entity category may be a generative adversarial network (GAN). The GAN may be trained based on the event data and/or other data (e.g., other data indicative of exchange preferences of users in a geographic area). The GAN may be trained to generate an artificial user input for a data source. That is, the GAN may be trained to generate an artificial user input that simulates what an individual in a geographic area may seek out (e.g., using the data source). In connection with the artificial user input, the GAN may also identify entities, entity categories, and/or goods and services, among other examples, that the artificial user input is intended to return from the data source. The data source may be a website, a news article, bulk data, or another source of information that includes information relating to customer reviews of entities, inventory listings of entities, and/or food menus of entities, among other examples.

Thus, the prediction system, using the GAN, may generate an artificial user input for a data source, such as a data source that includes information relating to one or more entities, one or more entity categories, and/or one or more geographic areas. Furthermore, the prediction system may provide the artificial user input to the data source and obtain an output from the data source responsive to the artificial user input. For example, the artificial user input may be a search query for "barbeque restaurants" that is provided to a data source associated with restaurant information, and the output of the data source may be food menus of restaurants responsive to the search query. The prediction system may determine whether the output differs from an expected output (e.g., which may be determined using the GAN, as described above, a different GAN, or a predictive machine learning model, among other examples). For example, if the food menus of the output do not contain items typically associated with barbeque restaurants, then the prediction system may determine that the output differs from the expected output. Based on determining that the output differs from the expected output, the prediction system may determine that a geographic area and/or an entity category associated with the artificial user input is associated with an opportunity.

In some implementations, the prediction system also may determine a value of the opportunity (e.g., a prediction of a monthly or annual revenue associated with the opportunity). The prediction system may determine the value of the opportunity based on the event data, and in particular, amounts associated with events of the event data. The prediction system may determine the value of the opportunity using a machine learning model (e.g., different from the machine learning model used to determine the opportunity). For example, the machine learning model may be trained to predict a value of an opportunity associated with an entity category in a geographic area.

In some implementations, based on determining that a geographic area is associated with an opportunity for an entity category, the prediction system may evaluate whether the determination is to be accepted or rejected (e.g., whether the determination is accurate). For example, the event data and/or the distances may indicate that a geographic area is associated with an opportunity for an entity category, when actually the entity category is associated with a lack of events or long travel distances due to other reasons.

In some implementations, the prediction system may accept or reject a determination of an opportunity based on historical event data. The historical event data may be older in time than the event data. For example, based on the historical event data, the prediction system may identify the existence of historical events associated with the entity category in the geographic area and a subsequent discontinuation of historical events associated with the entity category in the geographic area, thereby indicating that one or more entities associated with the entity category in the geographic area failed, relocated, or the like. Similarly, the prediction system may further identify one or more entities associated with the historical events associated with the entity category in the geographic area, and based on entity data (e.g., which may indicate termination dates of the one or more entities and/or may lack records for the one or more entities, thereby indicating termination of the one or more entities), the prediction system may determine whether the entities failed, relocated, or the like, subsequent to the historical events. Accordingly, the prediction system may reject a determination of an opportunity associated with an entity category in a geographic area based on the historical event data indicating the existence of historical events associated with the entity category in the geographic area.

In some implementations, the prediction system may accept or reject a determination of an opportunity based on information in one or more data sources (e.g., websites, news articles, or bulk data), such as one or more data sources that include customer reviews of entities, inventory listings of entities, and/or food menus of entities, among other examples. For example, based on information in one or more data sources, the prediction system may determine that an entity is misclassified in an entity category, and therefore, that events of the event data involving the entity are not associated with the entity category. As an example, the prediction system may determine that an entity is misclassified as a "barbeque restaurant" based on information from a data source indicating a food menu of the entity. Accordingly, the prediction system may reject a determination of an opportunity associated with an entity category in a geographic area based on a determination that one or more entities, involved in events associated with the entity category, are misclassified in the entity category. In some implementations, the prediction system may accept or reject a determination of an opportunity based on information in one or more data sources, as described above, using the GAN. For example, the prediction system may use the GAN, as described above, to identify whether an output of a data source differs from an expected output, thereby indicating a misclassification of an entity in an entity category, or the like.

As shown by reference number 125, the prediction system may transmit a notification indicating an opportunity for an entity category in a geographic area based on determining the opportunity. In some implementations, the notification may be transmitted for the entity that requested market research. For example, the notification may be transmitted to a user device associated with the entity.

In some implementations, the notification may be transmitted for an entity that operates (e.g., currently operates) in the geographic area. For example, the notification may be transmitted to a user device associated with the entity. The notification may further indicate a recommendation for changing an operating characteristic of the entity (e.g., a marketing strategy of the entity, offerings of the entity, an opening time and/or a closing time for the entity, or the like). The recommendation may indicate that a change should be made and/or may indicate a particular change that should be made. The prediction system may determine a particular change that should be made based on the event data and/or based on one or more data sources. For example, if the entity is associated with the entity category of "coffee shop," the prediction system may identify that events of the event data associated with the entity category of "coffee shop" occur mostly before 9 a.m., and therefore, the prediction system may determine a recommendation for the entity to change an opening time of the entity to an earlier time. As another example, if the entity is associated with the entity category of "restaurant," the prediction system may identify that pizza is the most common item involved in events of the event data associated with the entity category of "restaurant" or is the most common menu item of restaurants (e.g., based on the one or more data sources), and therefore, the prediction may determine a recommendation for the entity to change the offerings of the entity to include pizza.

In some implementations, the notification may be transmitted for the entity that applied for the services. For example, the notification may be transmitted to a user device associated with the entity. The prediction system may transmit the notification to the entity that applied for services if the entity is associated with the entity category and the geographic area of the opportunity that is determined. The notification may further indicate a recommendation for an action for the application for services. For example, the action may be to withdraw the application, to increase a requested amount of the application, to decrease a requested amount of the application, or the like. The prediction system may determine the action based on one or more characteristics of the opportunity, such as a predicted value of the opportunity. Additionally, or alternatively, the prediction system may determine the action based on one or more characteristics associated with the determination of the opportunity (e.g., using the machine learning model), such as a confidence score associated with the determination of the opportunity, a score or grade assigned to the opportunity, or the like.

In some implementations, the prediction system may transmit the notification for a first entity (e.g., the requesting entity for the market research or the entity that applied for the services). Based on transmitting the notification to the first entity, the prediction system may refrain from transmitting a notification indicating the opportunity to another entity. Thereafter, the prediction system may receive an indication that the first entity is declining to act upon the opportunity. For example, the notification may include an input element that enables transmission of the indication to the prediction system. The prediction system may transmit, based on receiving the indication, an additional notification for a second entity indicating the opportunity. Alternatively, the prediction system may determine that a time period (e.g., one week, one month, or the like) for the first entity to indicate an intention to act upon the opportunity has elapsed, and the prediction system may transmit the additional notification for the second entity based on the time period elapsing. The second entity may be another entity that requested market research or applied for services, an entity associated with the entity category and that operates in the geographic area or intends to operate in the geographic area, or an entity associated with the entity category that operates outside of the geographic area.

In some implementations, where determination of the opportunity is in connection with the application for services, the prediction system may perform an operation to cause (e.g., automatically) approval or rejection of the application based on whether the geographic area is associated with the opportunity for the entity category. For example, the operation may cause approval of the application if the prediction system determines that there is the opportunity, or the operation may cause rejection of the application if the prediction system does not determine that there is the opportunity. In some implementations, the prediction system may perform the operation further based on whether a value determined for the opportunity satisfies a threshold. To perform the operation, the prediction system may transmit, to a user device associated with a reviewer of the application (e.g., a loan officer), a notification indicating a recommendation for approval or rejection of the application. Additionally, or alternatively, to perform the operation, the prediction system may update a record, indicating a status of the application, to indicate approval or rejection of the application. Additionally, or alternatively, to perform the operation, the prediction system may transmit, to a user device associated with the entity, an indication of approval or rejection of the application.

In this way, the prediction system may accurately determine whether an entity category is associated with an opportunity in a geographic area. Accordingly, the prediction system may conserve computing resources that would otherwise be expended to identify opportunities with less accuracy. Moreover, by using machine learning, the prediction system may apply a rigorous and automated process to determine whether an entity category is associated with an opportunity in a geographic area. The machine learning used by the prediction system may enable recognition and/or identification of tens, hundreds, thousands, or millions of features and/or feature values for tens, hundreds, thousands, or millions of observations, thereby increasing accuracy and consistency and reducing delay associated with identifying opportunities relative to requiring computing resources to be allocated for tens, hundreds, or thousands of operators to manually identify opportunities using the features or feature values.

As indicated above, FIGS. 1A-1C are provided as an example. Other examples may differ from what is described with regard to FIGS. 1A-1C.

Figure 2:
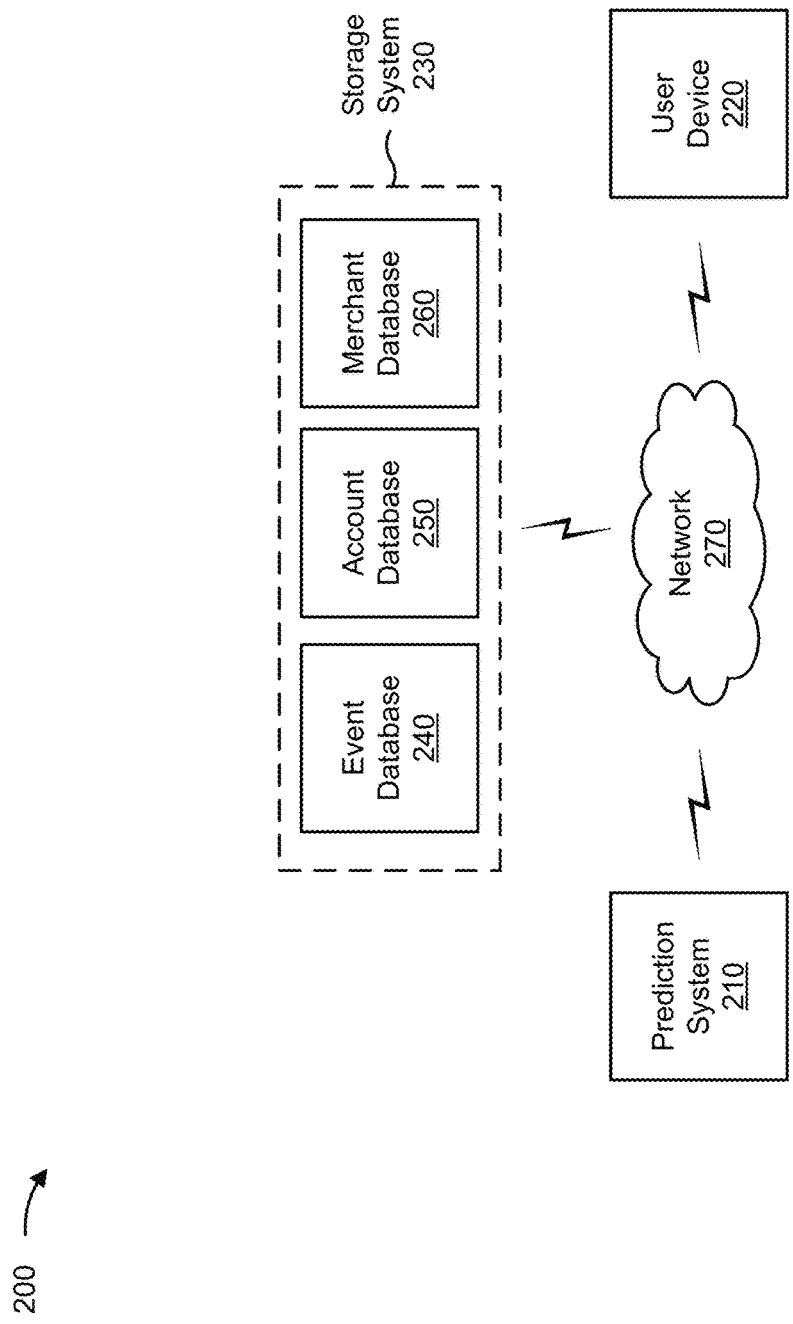
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a prediction system 210, a user device 220, a storage system 230 (e.g., that includes an event database 240, an account database 250, and/or a merchant database 260), and a network 270. Devices of environment 200 may interconnect via wired connections, wireless connections, or a combination of wired and wireless connections.

The prediction system 210 may include one or more devices capable of receiving, generating, storing, processing, providing, and/or routing information associated with prediction of an opportunity for an entity category in a geographic area, as described elsewhere herein. The prediction system 210 may include a communication device and/or a computing device. For example, the prediction system 210 may include a server, such as an application server, a client server, a web server, a database server, a host server, a proxy server, a virtual server (e.g., executing on computing hardware), or a server in a cloud computing system. In some implementations, the prediction system 210 may include computing hardware used in a cloud computing environment.

The user device 220 may include one or more devices capable of receiving, generating, storing, processing, and/or providing information associated with prediction of an opportunity for an entity category in a geographic area, as described elsewhere herein. The user device 220 may include a communication device and/or a computing device. For example, the user device 220 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The storage system 230 may include one or more devices capable of receiving, generating, storing, processing, and/or providing information associated with prediction of an opportunity for an entity category in a geographic area, as described elsewhere herein. The storage system 230 may include a communication device and/or a computing device. For example, the storage system 230 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. In some implementations, the storage system 230 may include the event database 240, the account database 250, and/or the merchant database 260.

The network 270 may include one or more wired and/or wireless networks. For example, the network 270 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 270 may enable communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
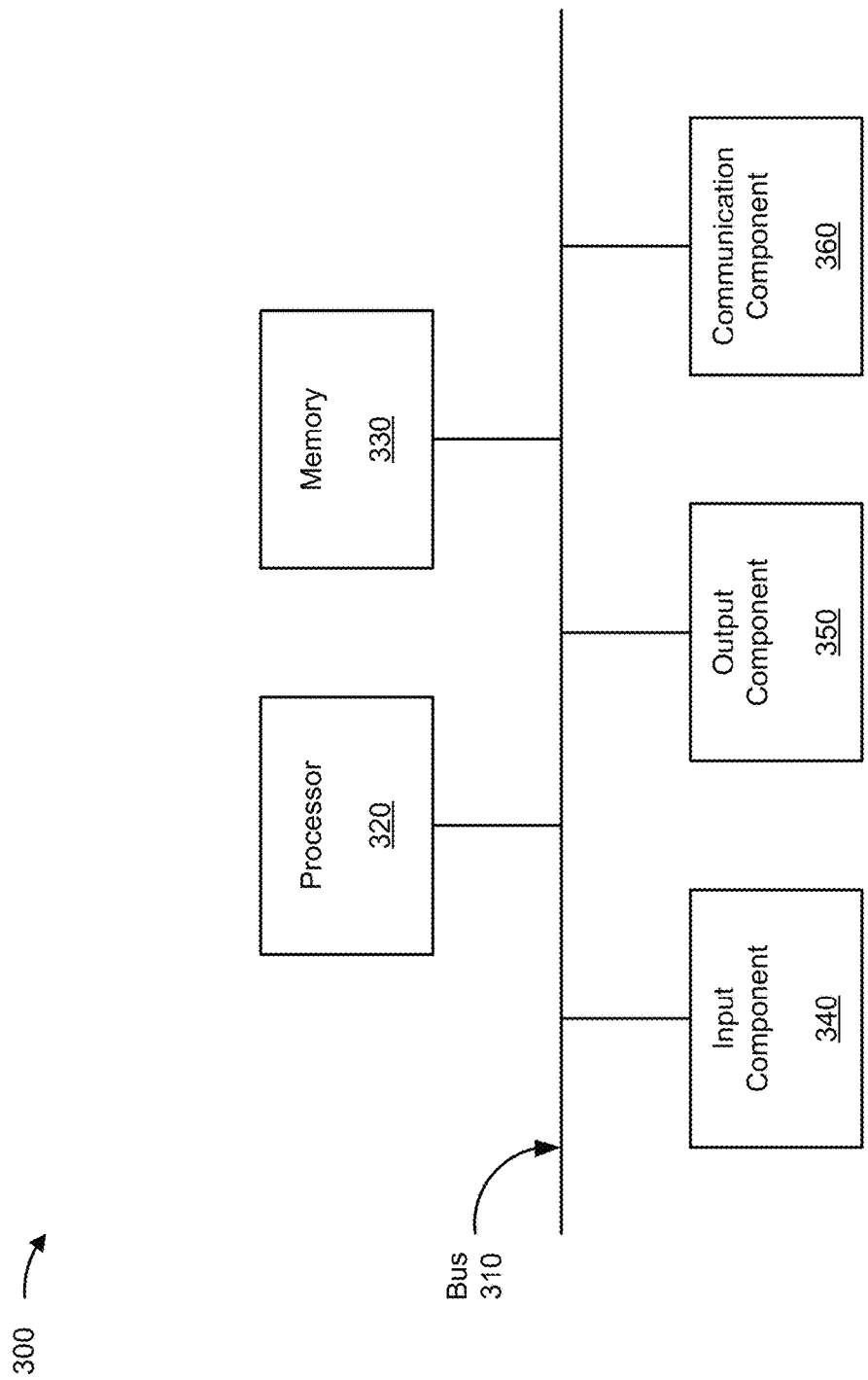
FIG. 3 is a diagram of example components of a device associated with machine learning model prediction of an opportunity for an entity category in a geographic area, in accordance with some embodiments of the present disclosure.

FIG. 3 is a diagram of example components of a device 300 associated with machine learning model prediction of an opportunity for an entity category in a geographic area. Device 300 may correspond to prediction system 210, user device 220, and/or storage system 230. In some implementations, prediction system 210, user device 220, and/or storage system 230 may include one or more devices 300 and/or one or more components of device 300. As shown in FIG. 3, device 300 may include a bus 310, a processor 320, a memory 330, an input component 340, an output component 350, and a communication component 360.

Bus 310 may include one or more components that enable wired and/or wireless communication among the components of device 300. Bus 310 may couple together two or more components of FIG. 3, such as via operative coupling, communicative coupling, electronic coupling, and/or electric coupling. For example, bus 310 may include an electrical connection, a wire, a trace, a lead, and/or a wireless bus. Processor 320 may include a central processing unit, a graphics processing unit, a microprocessor, a controller, a microcontroller, a digital signal processor, a field-programmable gate array, an application-specific integrated circuit, and/or another type of processing component. Processor 320 may be implemented in hardware, firmware, or a combination of hardware and software. In some implementations, processor 320 may include one or more processors capable of being programmed to perform one or more operations or processes described elsewhere herein.

Memory 330 may include volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 may store information, instructions, and/or software (e.g., one or more software applications) related to the operation of device 300. In some implementations, memory 330 may include one or more memories that are coupled (e.g., communicatively coupled) to one or more processors (e.g., processor 320), such as via bus 310. Communicative coupling between a processor 320 and a memory 330 may enable the processor 320 to read and/or process information stored in the memory 330 and/or to store information in the memory 330.

Input component 340 may enable device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 may enable device 300 to provide output, such as via a display, a speaker, and/or a light-emitting diode. Communication component 360 may enable device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, may cause the one or more processors 320 and/or the device 300 to perform one or more operations or processes described herein. In some implementations, hardwired circuitry may be used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
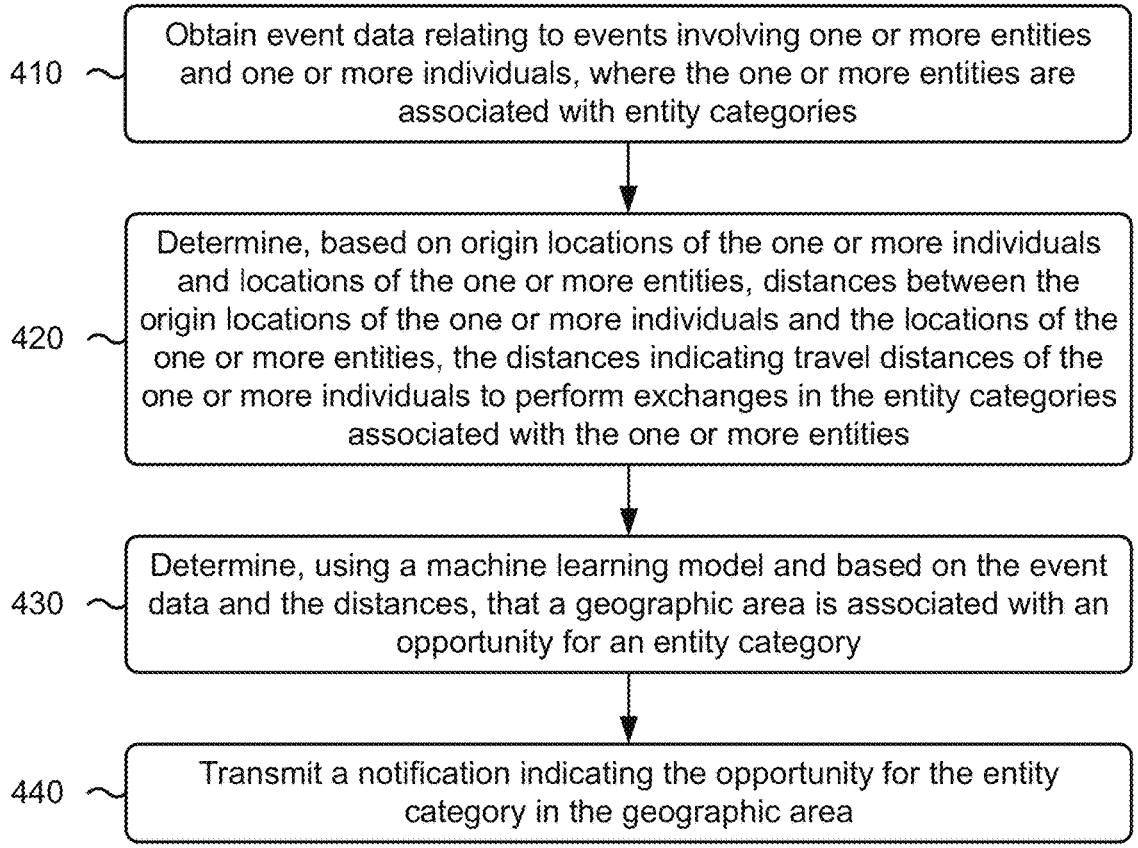
FIG. 4 is a flowchart of an example process associated with machine learning model prediction of an opportunity for an entity category in a geographic area, in accordance with some embodiments of the present disclosure.

FIG. 4 is a flowchart of an example process 400 associated with machine learning model prediction of an opportunity for an entity category in a geographic area. In some implementations, one or more process blocks of FIG. 4 may be performed by the prediction system 210. In some implementations, one or more process blocks of FIG. 4 may be performed by another device or a group of devices separate from or including the prediction system 210, such as the user device 220 and/or the storage system 230. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include obtaining event data relating to events involving one or more entities and one or more individuals, where the one or more entities are associated with entity categories (block 410). For example, the prediction system 210 (e.g., using processor 320, memory 330, and/or communication component 360) may obtain event data relating to events involving one or more entities and one or more individuals, as described above in connection with reference number 105 of FIG. 1A. As an example, the event data may indicate, for an event, an entity and an individual involved in the event, a time and/or a date of the event, and/or an amount associated with event. In some implementations, the one or more entities may be associated with entity categories.

As further shown in FIG. 4, process 400 may include determining, based on original locations of the one or more individuals and locations of the one or more entities, distances between the origin locations of the one or more individuals and the locations of the one or more entities, the distances indicating travel distances of the one or more individuals to perform exchanges in the entity categories associated with the one or more entities (block 420). For example, the prediction system 210 (e.g., using processor 320 and/or memory 330) may determine, based on original locations of the one or more individuals and locations of the one or more entities, distances between the origin locations of the one or more individuals and the locations of the one or more entities, as described above in connection with reference number 115 of FIG. 1B. As an example, if an entity category of an entity is "bookstore," and a distance between an origin location of an individual involved in an event with the entity and a location of the entity is 20 miles, then the distance may indicate that the individual traveled 20 miles to perform an exchange at a bookstore.

As further shown in FIG. 4, process 400 may include determining, using a machine learning model and based on the event data and the distances, that a geographic area is associated with an opportunity for an entity category (block 430). For example, the prediction system 210 (e.g., using processor 320 and/or memory 330) may determine, using a machine learning model and based on the event data and the distances, that a geographic area is associated with an opportunity for an entity category, as described above in connection with reference number 130 of FIG. 1C. As an example, the prediction system 210 may determine, using a machine learning model, that a geographic area associated with the origin location of the individual, that traveled 20 miles to perform an exchange at a bookstore, is associated with an opportunity for a bookstore.

As further shown in FIG. 4, process 400 may include transmitting a notification indicating the opportunity for the entity category in the geographic area (block 440). For example, the prediction system 210 (e.g., using processor 320, memory 330, and/or communication component 360) may transmit a notification indicating the opportunity for the entity category in the geographic area, as described above in connection with reference number 125 of FIG. 1C. As an example, the notification may be transmitted to a user device associated with a bookstore that requested market research for the geographic area, a bookstore associated with the geographic area that applied for services, and/or a bookstore currently operating in the geographic area.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1C. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for machine learning model prediction of an opportunity for an entity category in a geographic area, the system comprising:
   one or more memories; and
   one or more processors, communicatively coupled to the one or more memories, configured to:
      obtain information relating to an application for services by an entity, wherein the entity is associated with the entity category and the geographic area;
      obtain event data relating to events involving one or more entities and one or more individuals associated with origin locations in the geographic area, wherein the one or more entities are associated with entity categories;
      obtain location data indicating the origin locations associated with the one or more individuals and locations of the one or more entities;
      determine, based on the location data, distances between the origin locations associated with the one or more individuals and the locations of the one or more entities,
         the distances indicating travel distances of the one or more individuals to perform exchanges in the entity categories associated with the one or more entities;
      determine, using a machine learning model and based on the event data and the distances, whether the geographic area is associated with an opportunity for the entity category; and
      perform an operation to cause approval or rejection of the application based on whether the geographic area is associated with the opportunity for the entity category.

2. The system of claim 1, wherein the event data further indicates amounts associated with the events, and
   wherein the one or more processors are further configured to:
      determine a value of the opportunity for the entity category in the geographic area,
         wherein the operation to cause approval or rejection of the application is further based on whether the value of the opportunity for the entity satisfies a threshold.

3. The system of claim 1, wherein the machine learning model is trained, using an unsupervised learning technique, to determine whether the geographic area is associated with the opportunity for the entity category.

4. The system of claim 3, wherein the unsupervised learning technique is based on an unsupervised anomaly detection algorithm.

5. The system of claim 1, wherein the one or more processors, to perform the operation, are configured to:
   transmit, to a user device associated with a reviewer of the application, a notification indicating a recommendation for approval of the application or a notification indicating a recommendation for rejection of the application.

6. The system of claim 1, wherein the one or more processors, to perform the operation, are configured to:
   update a record, indicating a status of the application, to indicate approval or rejection of the application.

7. The system of claim 1, wherein the one or more processors, to perform the operation, are configured to:
   transmit, to a user device associated with the entity, an indication of approval or rejection of the application.

8. A method of machine learning model prediction of an opportunity for an entity category in a geographic area, comprising:
   obtaining, by a device, information relating to an application for services by an entity,
      wherein the entity is associated with the entity category and the geographic area;
   obtaining, by the device, event data relating to events involving one or more entities and one or more individuals associated with origin locations in the geographic area,
      wherein the one or more entities are associated with entity categories;
   determining, by the device based on the origin locations associated with the one or more individuals and locations of the one or more entities, distances between the origin locations associated with the one or more individuals and the locations of the one or more entities,
      the distances indicating travel distances of the one or more individuals to perform exchanges in the entity categories associated with the one or more entities;
   determining, by the device using a machine learning model and based on the event data and the distances, that a geographic area is associated with an opportunity for an entity category, of the entity categories;
   performing, by the device, an operation to cause approval or rejection of the application based on whether the geographic area is associated with the opportunity for the entity category; and transmitting, by the device, a notification indicating the opportunity for the entity category associated with the geographic area.

9. The method of claim 8, wherein the notification is transmitted for an entity that operates in the geographic area, and
wherein the notification further indicates a recommendation for changing an operating characteristic of the entity.

10. The method of claim 8, wherein the notification is transmitted for an entity that has applied for services that are associated with the entity category and the geographic area.

11. The method of claim 8, wherein the notification is transmitted for a first entity, and
wherein the method further comprises:
receiving an indication that the first entity is declining to act upon the opportunity for the entity category; and
transmitting, based on the indication, an additional notification for a second entity indicating the opportunity for the entity category in the geographic area.

12. The method of claim 8, wherein the notification is transmitted for a first entity, and
wherein the method further comprises:
determining that a time period for the first entity to indicate an intention to act upon the opportunity for the entity category has elapsed; and
transmitting, based on determining that the time period has elapsed, an additional notification for a second entity indicating the opportunity for the entity category in the geographic area.

13. The method of claim 8, wherein the machine learning model is trained to output information indicating the entity category based on an input of the event data relating to the geographic area.

14. The method of claim 8, wherein the machine learning model is trained to output information indicating the entity category based on an input of the event data relating to multiple geographic areas and information identifying the geographic area.

15. A non-transitory computer-readable medium storing a set of instructions for prediction of an opportunity for an entity category in a geographic area, the set of instructions comprising:
one or more instructions that, when executed by one or more processors of a device, cause the device to:
obtain information relating to an application for services by an entity,
wherein the entity is associated with an entity category and a geographic area;
obtain event data relating to events involving one or more entities and one or more individuals associated with origin locations in the geographic area: wherein
determine, based on location data indicating the origin locations associated with the one or more individuals and locations of the one or more entities, distances between the origin locations associated with the one or more individuals and the locations of the one or more entities,
the distances indicating travel distances of the one or more individuals to perform exchanges in the entity categories associated with the one or more entities;
determine, using a machine learning model and based on the event data and the distances, whether the geographic area is associated with the opportunity for the entity category;
transmit a notification indicating the opportunity for the entity category in the geographic area; and
perform an operation to cause approval or rejection of the application based on whether the geographic area is associated with the opportunity for the entity category.

16. The non-transitory computer-readable medium of claim 15, wherein the machine learning model is a generative adversarial network, and
wherein the one or more instructions, when executed by the one or more processors, further cause the device to:
generate, using the generative adversarial network, an artificial user input for a data source;
provide the artificial user input to the data source;
obtain an output from the data source responsive to the artificial user input; and
determine that the output differs from an expected output,
wherein the one or more instructions, that cause the device to determine that the geographic area is associated with the opportunity for the entity category, cause the device to determine that the geographic area is associated with the opportunity for the entity category based on the output differing from the expected output.

17. The non-transitory computer-readable medium of claim 15, wherein the one or more instructions, when executed by the one or more processors, further cause the device to:
accept or reject a determination of the opportunity for the entity category in the geographic area based on at least one of historical event data or information in one or more data sources.

18. The non-transitory computer-readable medium of claim 15, wherein the one or more instructions, that cause the device to transmit the notification, cause the device to transmit the notification for an entity that operates in the geographic area, and
wherein the notification further indicates a recommendation for changing an operating characteristic of the entity.

19. The non-transitory computer-readable medium of claim 18, wherein the one or more instructions, when executed by the one or more processors, further cause the device to:
determine the recommendation for changing the operating characteristic of the entity based on the event data.

20. The non-transitory computer-readable medium of claim 15, wherein the machine learning model is trained, using an unsupervised learning technique, to determine whether the geographic area is associated with the opportunity for the entity category.

* * * * *